(12) United States Patent
Andersson et al.

(10) Patent No.: US 9,167,754 B2
(45) Date of Patent: Oct. 27, 2015

(54) GREENHOUSE SCREEN

(71) Applicant: AB Ludvig Svensson, Kinna (SE)

(72) Inventors: Hans Andersson, Kinna (SE); Per Holgerson, Molndal (SE)

(73) Assignee: AB Ludvig Svensson, Kinna (SE)

( * ) Notice: Subject to any disclaimer, the term of this patent is extended or adjusted under 35 U.S.C. 154(b) by 0 days.

(21) Appl. No.: 14/345,722

(22) PCT Filed: Sep. 18, 2012

(86) PCT No.: PCT/EP2012/068356
§ 371 (c)(1),
(2) Date: Mar. 19, 2014

(87) PCT Pub. No.: WO2013/041524
PCT Pub. Date: Mar. 28, 2013

(65) Prior Publication Data
US 2015/0059239 A1 Mar. 5, 2015

Related U.S. Application Data

(60) Provisional application No. 61/537,605, filed on Sep. 22, 2011.

(30) Foreign Application Priority Data

Sep. 22, 2011 (SE) ...................... 1150865

(51) Int. Cl.
*A01G 13/02* (2006.01)
*A01G 9/00* (2006.01)
(Continued)

(52) U.S. Cl.
CPC .............. *A01G 9/22* (2013.01); *A01G 9/1438* (2013.01); *A01G 9/247* (2013.01); *D04B 21/16* (2013.01); *D10B 2401/22* (2013.01); *D10B 2403/0243* (2013.01); *D10B 2503/02* (2013.01)

(58) Field of Classification Search
CPC .............. A01K 39/00; A01K 39/0206; A01G 2009/1461; A01G 2009/1453; A01G 9/227; A01G 9/22; A01G 13/0281
USPC ........................................... 47/21.1, 20.1, 17
See application file for complete search history.

(56) References Cited

U.S. PATENT DOCUMENTS 3,837,943 A 9/1974 Ploch et al.
4,298,643 A 11/1981 Miyagawa et al.
(Continued)

FOREIGN PATENT DOCUMENTS

EP 0 109 951 11/1983
WO WO 01/96882 A1 2/2011

OTHER PUBLICATIONS

Adanus, Sabit, "Dyeing, Printing and Finishing", Wellington Sears Handbook of Industrial Textiles, 1995, p. 161-162 (2 pages).
(Continued)

*Primary Examiner* — Kristen C Hayes
(74) *Attorney, Agent, or Firm* — Myers Bigel Sibley & Sajovec, PA

(57) ABSTRACT

The invention refers to a greenhouse screen comprising strips of film material that are interconnected by a yarn framework of transverse threads and longitudinal threads to form a continuous product, wherein the yarn framework is thermally bonded to at least one side of the strips of film material, wherein also those parts of the yarn framework that is thermally bonded to the strips have liquid-transporting capacity by capillary action. The amount of yarn in the yarn framework interconnecting and holding the strips can herewith be reduced.

31 Claims, 3 Drawing Sheets

(51) Int. Cl.
*A01G 9/22* (2006.01)
*A01G 9/14* (2006.01)
*D04B 21/16* (2006.01)
*A01G 9/24* (2006.01)

(56) References Cited

U.S. PATENT DOCUMENTS 4,626,465 A * 12/1986 Henningsson ............... 442/186
4,632,863 A * 12/1986 Henningsson ............... 442/186
5,288,545 A * 2/1994 De Decker ................... 442/185
2003/0072910 A1 4/2003 Tsurumaki et al.

OTHER PUBLICATIONS

Kaswell, Ernest R., "Heat Setting of Thermoplastic Fiber Fabrics", Wellington Sears Handbook of Industrial Textiles, 1963, p. 137-138 (2 pages).
Rouette et al., "Fixation", Encyclopedia of Textile Finishing, vol. 1, 2001, p. 844 (1 page).

* cited by examiner

*Fig. 1A* *Prior Art*

GREENHOUSE SCREEN

RELATED APPLICATIONS

The present application is a 35 U.S.C. §371 national phase application of PCT International Application No. PCT/EP2012/068356, filed 18 Sep. 2012, which claims priority from Swedish Patent Application No. 1150865-2, filed 22 Sep. 2011 and U.S. Provisional Patent Application No. 61/537,605 filed 22 Sep. 2011; the disclosures of which are hereby incorporated herein by reference in their entireties. PCT International Application No. PCT/EP2012/068356 is published in English as International Publication No. WO 2013/041524 A1.

TECHNICAL FIELD

The present disclosure refers to a greenhouse screen of the kind that comprises a plurality of flexible strips of film material, which are interconnected by a yarn framework to form a continuous product.

BACKGROUND OF THE INVENTION

Greenhouse screens are used frequently for energy saving, shading and temperature control. One known type of greenhouse screens comprises a plurality of flexible strips of film material extending in parallel to each other, and which by means of a knitting, warp-knitting or weaving process are interconnected by a yarn framework to form a continuous product, wherein the strips form a major part of the surface area of the product. Such a greenhouse screen is known for example through EP 0 109 951. Other examples of screens of this type are shown in FR 2 071 064, EP 1 342 824, WO 2008/091192 and in WO 2011/096882.

The strips of flexible film material can be of selected materials providing desired properties with respect to reflection and light, moisture and heat transmission.

DE 20 2008 004 181 U1 discloses a two-layer greenhouse screen comprising a standard greenhouse screen as bottom layer and on top of this layer reflective strips that are glued to the screen at certain intervals. This creates a screen which is less drapable. Water transportation through capillary action is prevented in the areas of the yarn framework located between the bottom and top layer strips. Water may be trapped in those areas of the yarn increasing the risk for *algae* growth. The double-layer structure further has the disadvantage of creating a big bundle when the screen is in rested position.

US 2004/198126 refers to a light-shading sheet for agricultural and horticultural use comprising a light-shading white film and a reinforcement made of textile fabric or a nonwoven fabric. The reinforcement is laminated to the backside of the film. The film may be slitted to from strips that are laminated spaced apart to the reinforcement. The lamination technique used is adhesive or "sandwich lamination", wherein the latter is defined as a technique of laminating the textile or nonwoven fabric and the white film via an adhesive layer made of lamination resin disposed between the layers.

JP 10327684 A discloses a shading net capable of reflecting strong solar heat and suitable for agriculture, horticulture etc, The shading net comprises tape-shaped yarns of nonwoven fabric, e g of continuous glass fiber filaments, thermally fused to the surface of a net base fabric. The yarns of the net base fabric may be formed by slitting and stretch-orienting a film.

JP 2004154078 A discloses a greenhouse formed by laminating a thermoplastic film on one or both surfaces of a clothlike material. The clothlike material consists of thermoplastic resin wire elements.

JP 2004160812 A discloses a moisture permeable sheet having water barrier properties and used as an agricultural cover material. The sheet comprises a moisture permeable film laminated on a cloth-like material and a porous sheet.

The aim of protected cultivation in greenhouses is to modify the natural environment to increase yield, to improve product quality, to conserve resources, to extend production areas and crop cycles among others. However, the current trend in horticulture is to be more energy efficient by minimizing energy use in all stages while maximizing production yield. This means that the growers tend to insulate the greenhouse as much as possible during the cold winter months to decrease the amount of energy used to heat the greenhouse, but without negatively affecting the production or quality of the crop. The insulation is normally achieved by using one to several layers of greenhouse screens. To maximize energy savings, the top layer of the upper-most screen should have low emissivity, i.e. low ability to emit energy by radiation. This is normally achieved by using aluminum laminate strips knitted into the structure. However, today's state of the art screens also often have part of the yarn framework covering the top layer aluminum, decreasing the energy saving since the yarns are made of plastic materials with high emissivity. Hence, it would be advantageous to have a screen in which the amount of yarn, especially amount of yarn facing upward, is minimized, thereby minimizing the radiation losses.

The lower-most screen in a multilayer installation is usually a transparent screen. For many crops, the rule of thumb is, 1% less light equals 1% less production. This means that light transmission losses in such a screen should be minimized to increase production when the screen is used during daytime. This can be achieved by choosing materials which maximize the light transmission of the screen. The yarn framework usually prevents a significant amount of light from being transmitted through the screen. Hence, a significant improvement of today's state of the art screen is possible if the amount of yarn used to construct the screen could be decreased without losing out on other important properties of the screen such as robustness, water transmission etc.

The water vapor transmission is a very important property of the screen since this is a significant factor controlling the humidity level in the greenhouse. The water vapor transmission is mainly controlled by the width of the strips and the type of yarn used. The yarn should therefore have liquid-transporting capacity by capillary action, in order to be able to absorb and distribute condense water along the screen. Normally, the strip should completely fill the voids between the pillar stitches to maximize the energy saving properties of the screen. In some cases, it is an advantage to have a screen that can transmit more water vapor, for example avoiding having to open the screen ("gapping") to lower the humidity level in the greenhouse. This could be achieved by using a narrower strip. However, in the state of the art screen of today it is not possible to make the strip narrower since this may cause problems with strips being pulled out of the structure of the screen by wind etc. when the strip is no longer in contact with the yarn that will hold the strip in place by friction forces.

The bundle size is an important feature of the screen. A big bundle of a single screen can cause losses of ~3% of natural light, hence to maximize production the screen bundle size should be minimized. The bundle size is controlled by the thickness of the film, and the yarn framework that is used.

The robustness of the screen is another important feature. The installation of the screen in the greenhouse is often made by unskilled labor. Hence it is vital to make a screen that can withstand rough handling during installation and use without compromising the excellent properties needed to achieve the right climate for the plant, such as high light transmission, high reflection, low emission, air tightness etc.

SUMMARY OF THE INVENTION

The invention refers to a greenhouse screen aiming to solve the above problems, said greenhouse screen comprising strips of film material that are interconnected by a yarn framework to form a continuous product, said yarn framework having liquid-transporting capacity by capillary action, wherein the yarn framework is thermally bonded to at least one side of the strips of film material, and wherein also those parts of the yarn framework that is thermally bonded to the strips have liquid-transporting capacity by capillary action.

The greenhouse screen may have a capillary rise of tap water as measured according to ISO9073-6:2000 of at least 10 mm after 10 seconds both in longitudinal and in transverse direction of the screen.

The film material may be a multilayer film comprising at least two layers, wherein at least one top layer is a thermoplastic polymer top layer having a softening point of between 5-200° C. lower than another layer of the multilayer film.

The thermoplastic polymer top layer may have a softening temperature of between 7-185° C., preferably between 10-175° C. lower than the another layer of the multilayer film.

The thermoplastic polymer top layer may be chosen from polymer materials of the group consisting of polyethylene and copolymers thereof, polypropylene and copolymers thereof, polyesters and co-polyesters, and acrylics.

The strips may comprise a reflective metal foil layer laminated to the multilayer film.

The strips of film material may be bonded to the yarn framework with a peel strength of at least 1 mN/mm, preferably 10 mN/mm, and most preferably with a peel strength of at least 30 mN/mm.

The threads making up the yarn framework may comprise at least two different components, wherein at least one component may be a thermoplastic polymer yarn component having a softening temperature of between 5-200° C. lower than the other component, and in that the yarn framework may be thermally bonded to at least one side of the strips of film material.

The thermoplastic polymer yarn component may have a softening temperature of between 7-185° C., preferably of between 10-175° C. lower than the other yarn component.

The thermoplastic polymer yarn component may be chosen from polymer materials of the group consisting of polyethylene or copolymers thereof, polypropylenes or copolymers thereof, polyamides, polyesters or copolymers thereof.

The thermoplastic polymer yarn component may be incorporated into the yarn framework by intertwining one or more fibers together, wherein at least one of the fibers may comprise said thermoplastic polymer yarn component.

The thermoplastic polymer yarn component may form a coat covering a fiber core material, said fiber core material may have a higher melting temperature than the thermoplastic polymer yarn component.

The thermoplastic polymer yarn component may form a coat covering at least part of the yarn framework.

Both transverse threads and longitudinal threads may comprise the thermoplastic polymer yarn component.

Alternatively only the transverse threads may comprise the thermoplastic polymer yarn component The yarn framework may be thermally bonded to both sides of the strips of film material.

Alternatively the yarn framework may be thermally bonded to only one side of the strips of film material.

One side of the screen may have a higher amount of transverse threads than the opposite side of the screen, so that more than 50% of the transverse threads of the yarn framework extending in a transverse (x) direction, may be located on said one side of the strips of film material.

More than 60%, more than 70%, more than 80%, more than 90% and even 100% of the transverse threads of the yarn framework may be located on said one side of the strips of film material.

At least 5%, preferably at least 10% of the transverse threads of the yarn framework may be located on said opposite side of the screen Said strips of film material may be interconnected by the yarn framework through hosiery, knitting, warp-knitting or weaving.

The screen may comprise one or more strips of film material that has a width that is smaller than the distance between the warp threads.

A gap may be formed between said one or more strips and the adjacent strip(s), said gap permitting ventilation through said screen.

BRIEF DESCRIPTION OF THE DRAWINGS

In the following the invention will be described in a non-limiting way and in more detail with reference to exemplary embodiments illustrated in the enclosed drawings, in which:

FIG. 1A shows a schematic enlarged view of a part of a first example of a warp-knitted screen.

DETAILED DESCRIPTION OF PREFERRED EMBODIMENTS

Figure 1B:
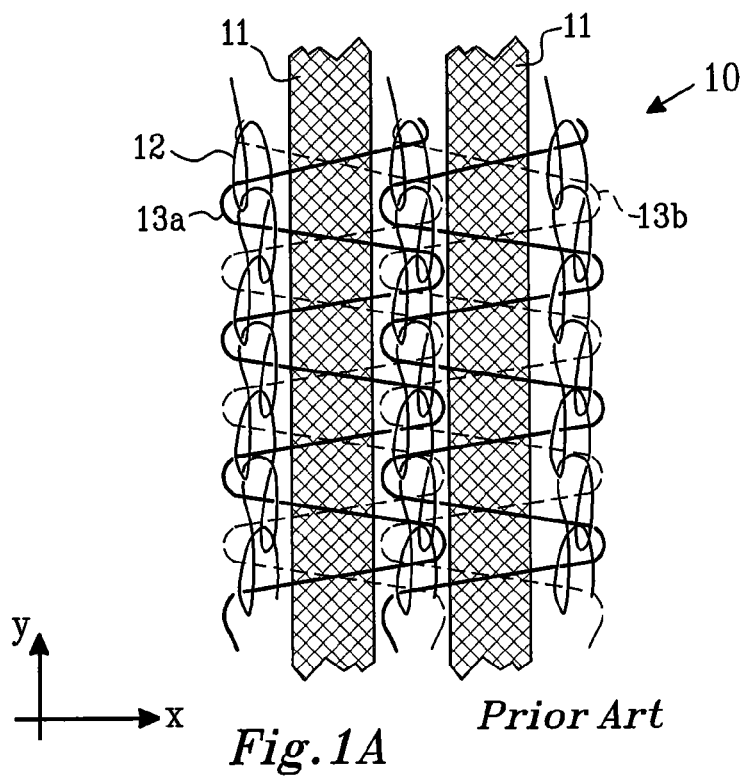
FIG. 1B shows a schematic enlarged view of a part of a second example of warp-knitted screen.

The greenhouse screen of the invention comprises a plurality of narrow strips of film material 11 which are interconnected by a yarn framework 12, 13a, 13b, and are arranged in parallel to each other so as to form essentially a continuous surface. The screen has a longitudinal direction, y, and a transverse direction, x, wherein the strips 11 extend in the longitudinal direction y.

FIG. 1A shows an example of a mesh pattern for a fabric manufactured through a warp knitting process as described in EP 0 109 951, in which four guide bars are used, one for the strips 11, two for the weft threads 13a and 13b extending transversely to these strips 11 and one for the longitudinally extending warp threads 12.

The longitudinal warp threads 12 are generally arranged on one side of the screen, the underside, while the transverse weft threads 13a and 13b are located on both sides of the fabric, the upper and the underside. The term "transverse" in this respect is not restricted to a direction perpendicular to the longitudinal direction, but means that the transverse weft threads 13a and 13b extend across the strips 11 as illustrated in the drawings. The connection between the longitudinal warp threads and the transverse weft threads are preferably made on the underside of the fabric. Consequently, the strips 11 can be arranged closely edge to edge without being prevented by the longitudinal warp threads 12.

The longitudinal warp threads 12 in FIG. 1A extend continuously in unbroken fashion along opposite edges of adjacent strips, in a series of knitted stitches, in a so called open pillar stitch formation.

The transverse weft threads 13a and 13b pass above and below the strips, respectively, i.e. opposed to each other, to fixedly trap the strips. Each knitted stitch in the longitudinal warp threads 12 has two such transverse threads 13a and 13b engaging with it.

FIG. 1B shows another example of a mesh pattern for a fabric similar to the one in FIG. 1A. The difference is that the transverse weft threads 13a and 13b in an alternating way pass over one and two strips 11.

In both mesh patterns shown in FIGS. 1A and 1B, and known in prior art, the amount of transverse weft threads 13a and 13b passing above and below the strips, respectively, are equal. The weft threads 13a and 13b connect to the longitudinally extending warp threads 12 between, or below the strips, thereby trapping the strips 11 in the yarn framework. Consequently in the examples described in FIGS. 1A and 1B, each strip 11 has the same number of transverse weft threads crossing its top side as its underside, thereby fixing each strip tightly in the yarn framework.

It is also known through EP 0 109 951 to submit the fabric to "thermo-setting", wherein a heat-shrinkable material is used in the weft threads and the fabric after manufacture is passed through a heat zone of about 150° C. under tension. The yarn framework will then heat-shrink resulting in a strengthening of the fixation of the strips. No thermal bonding between the yarn framework and the strips however occurs during such thermo-setting according to prior art.

According to the present invention the yarn framework is thermally bonded to the strips of film material. Thermal bonding is accomplished by the application of heat and possibly also pressure. Thermal bonding may be accomplished by different methods known in the art, such as hot calendaring, through-air bonding, ultrasonic bonding, radiant heat bonding etc. Thermal bonding means that at least a part of the material in the film strips and/or the yarn framework melts or softens and will bond to other parts of the fabric (yarn framework and/or film strips) at contact points.

Through the thermal bonding of the yarn framework to the film strips the amount of threads in the yarn framework can be reduced, without the risk of the strips leaving the yarn framework. It is of special advantage to reduce the amount of threads covering the side of the strips facing upwards, in order to minimize radiation losses due to the high emissivity of the yarn. Thus for strips having a surface with a low emissivity the yarns on the upper side of the strips will deteriorate the emission properties. For strips that are transparent, the yarn will reduce the light transmission. An overall reduction of the amount of yarn will improve the light transmission of the screen.

The peel strength between the yarn framework and the film strips may be at least 1 mN/mm. The peel strength is measured by the method described below.

The strips 11 of film material of the invention may comprise any kind of film material that gives the greenhouse screen desirable properties for use in a greenhouse. Such film materials are known to the person skilled in the art. For example by using a film material transparent to sunlight, but not transparent to heat radiation, it is possible to obtain an energy screen that can be used both during the night and during cold days. Strips which are not transparent to sunlight, such as metalized plastic strips reflecting the sunlight, and having low emissivity to heat may provide greater shading effect and may provide better insulation compared to the above.

Furthermore, the strips of the invention can include a reflective metal foil layer, such as an aluminum foil, which is laminated to a multilayer film with at least two layers wherein at least one top layer is a thermoplastic polymer tip layer having a softening point of between 5-200° C. lower than another layer of the multilayer film. At least one of the top layers should be able to bond to the yarn system, the other top layer can either be bonded directly to the aluminum foil or bonded with an adhesive to the aluminum foil according to standard methods known by people skilled in the art. The aluminum foil may have additional coatings or be laminated to other films.

Furthermore, strips comprising a material which is low emitting for heat radiation can be used for heat insulation at night. The emissivity of a material is the relative ability of its surface to emit energy by radiation. It is the ratio of energy radiated by a particular material to energy radiated by a black body at the same temperature. It is a measure of a material's ability to radiate absorbed energy. Examples of strips that are low emitting for all radiation could be foil strips, e.g. a low emitting metal foil, preferably an aluminum foil, or plastic film strips laminated with aluminum foil strips.

Furthermore the invention also encompasses strips of film material that comprises flame-retardant materials or additives, UV-stabilizers, light-reflecting pigments, dark colored pigments, or metal powder, processing aids, fillers, anti-static additives, antifogging additives, infrared absorbers, anti-block additives.

A typical width of the strips is between 2 mm and 10 mm, but they can also be wider. The person skilled in the art also realizes that the greenhouse screen of the invention may be composed of a mixture of one or more types of strips of film material described above, in one and the same screen. Furthermore, greenhouse screen of the invention may also contain strips of varying widths, the advantage of which will be discussed below.

In one embodiment of the invention at least some of the strips of film material are of a multilayer film material comprising at least two layers; at least one base layer or internal layer, and at least one top or skin layer. The base layer may be a single layer or a multilayer material. The base layer may comprise any kind of film material as described above. The top layer is preferably the layer located closest to the surface on one side, or on both sides of the multilayered film strip, and is comprised of a thermoplastic polymer material, capable of forming a heat seal bond to itself or to the yarn system. The thermoplastic polymer material of the top layer softens to a sufficient extent that its viscosity becomes low enough to allow adequate wetting for it to adhere to the surface to which it is being bonded to. The bond is accomplished by applying heat to soften the top layer, and preferably by simultaneously applying pressure, without melting the other layers, i.e. the base layer in the film or the yarns in the yarn framework. Thus the top layer should begin to soften at a temperature such that the bond can be formed at a temperature which is lower than the melting temperature of the polymeric material of the base layer.

In one embodiment, the top layer should begin to soften at a temperature which is between 5-200° C., preferably between 7-185° C., more preferably between 10-175° C. below the melting point of the base layer (or the melting point of the layer with the lowest melting point in the base layer).

The choice of thermoplastic polymer of the top layer is thus dependent on the composition of the base layer. Examples of materials used for forming the film strips, i.e. the base layer, are without being limiting, aluminum, polyesters, polyethylenes (PE), ethylene vinyl acetate (EVA), polypropylenes (PP), polyvinyl chloride (PVC), polyvinylidene fluoride (PVDF), ethylene tetrafluoroethylene (ETFE), polyvinylidene chloride (PVDC), polyacrylics, polyamides (PA), ionomers, poly(lactic acid) or polylactide (PLA), polyvinylalcohol. The thermoplastic polymer material used in forming the top layer may be chosen from polymers that are able to create a peel strength of at least 1 mN/mm to itself or to the yarn system at a temperature of 80° C.-220° C. Examples, of such materials are polyethylene and copolymers thereof, such as EVA; polypropylene and copolymers thereof, polyesters and co-polyesters, polyamides and co-polyamides, acrylics.

At least 50%, preferably at least 75% of the strips should in this embodiment be of a multilayer film material, comprising a base layer and at least one top layer. In one embodiment all strips are of the multilayer film material.

A typical thickness of the film strips is between 5.5 and 300 µm. A suitable thickness of the top layer is between 0.5 and 50 µm, more preferably between 0.5 and 20 µm, most preferably between 0.5 and 5 µm. A suitable thickness of the base layer is between 5 and 300 µm, more preferably between 10 and 100 µm, most preferably between 10 and 70 µm.

The strips of film material, such as those described above, are interconnected by a yarn framework to form a continuous product. The yarn framework generally comprises warp threads 12 forming loops or stitches and primarily extending in the longitudinal direction, y of the screen. The warp threads 12 are connected to one another by one or more weft threads 13a and 13b extending generally in the transverse, x direction of the continuous product.

The threads used in the yarn framework may be made from materials normally used in greenhouse screens, and which are well known to the person skilled in the art. The threads of the yarn framework may for example be made from textile materials, polymer materials such as polyesters, polyethylenes, polypropylenes, aramids, para-aramids, acrylics, modacrylics, polyamides or a mix of two or more of these materials. The threads may also be made from elastic or stretchable material. The threads of the yarn framework should have liquid-transporting capacity by capillary action, usually by being formed from a plurality of fibers or continuous filaments that are intertwined, wherein liquid may be drawn up between the individual fibers or filaments as a result of intermolecular attractive forces between the liquid and the fiber/filament surfaces.

Capillary action, or capillarity, is defined as the ability of a liquid to flow in narrow spaces without the assistance of and in opposition to external forces like gravity.

Furthermore, the threads may comprise flame-retardant additives, UV-stabilizers, light-reflecting pigments, dark colored pigments, or metal powder, processing aids, fillers, anti-static additives, infrared (ir)-absorbers, anti-block additives.

The invention also encompasses yarn frameworks wherein the longitudinal warp threads and transverse weft threads are not both made from the same material.

In one embodiment of the invention the threads making up the yarn framework comprise at least two different components, wherein at least one component is a thermoplastic polymer yarn component capable of forming a heat seal bond to itself, to the other components making up the yarn framework, or to the strips of film material. The thermoplastic polymer yarn component softens to a sufficient extent that its viscosity becomes low enough to allow adequate wetting for it to adhere to the surface to which it is being bonded. The bond is accomplished by heating the thermoplastic polymer yarn component, and preferably by applying pressure simultaneously, without melting the other components making up the yarn system, or melting the material in the film strip. Thus the thermoplastic polymer yarn component should begin to soften at a temperature such that the bond can be formed at a temperature which is less than the melting temperature of the materials of the other yarn components making up the yarn framework.

In one embodiment, the thermoplastic polymer yarn component has a softening temperature which is between 5-200° C., preferably between 7-185° C., and most preferably between 10-175° C. below the melting point of the other yarn components making up the yarn framework (or the melting point of the component of the yarn framework or the strips with the lowest melting point).

Examples of thermoplastic polymer yarn components may be polyethylenes or copolymers thereof (such as ethylene vinyl acetates (EVA)), polypropylenes or copolymers thereof, polyamides, polyesters or copolymers thereof, among others. The thermoplastic polymer yarn component may be incorporated into the yarn by intertwining one or more fibers together, to form one thread (i.e. a weft thread or a warp thread) wherein at least one of the fibers comprises said thermoplastic polymer yarn component.

One example of a multifilament hybrid yarn of this kind can be found in U.S. Pat. No. 5,618,624.

The fibers of the yarn in the yarn framework may also be bicomponent or multicomponent. The bi- or multicomponent fibers can be of the sheath/core type consisting of a low melting temperature sheath (i.e. a thermoplastic polymer yarn component as described above) and a higher melting temperature core. In this type of fibers the thermoplastic polymer yarn component forms a coat covering the fiber core material that has a higher melting temperature than the coating thermoplastic polymer yarn component. Common sheath/core combinations include PE/PP, PE/(polyethylene terephthalate) PET, Co-PET/PET, PP/PET, PA-6/PET, PVA/PP etc. The multicomponent fibers can be used in 100% form as well as in blends with homopolymer fibers to create a suitable yarn. Other multicomponent fiber configurations are also possible such as for example side-by-side, segmented pie, islands in the sea etc, all of which are known to the person skilled in the art.

Furthermore, any of the threads comprised in the yarn network may comprise fibers with the thermoplastic yarn component, i.e. the transverse weft threads, the longitudinal warp threads or both. However, in a preferred embodiment of the invention the transverse weft threads (13a, and/or 13b) comprise fibers with a thermoplastic polymer yarn component having a softening point as described above, below the softening points of the other components.

In the case where the yarn framework comprises components having different melting points, as referred to above, the film strips may be of any optional kind, and may or may not, be of the multi-layer kind having a top layer with a lower melting point than the base layer.

The strips of film material are interconnected to each other and the yarn framework through hosiery, knitting, warp-knitting or weaving known in the art. Since according to the present invention the strips and the yarn are thermally bonded together it is possible to minimize the amount of yarn covering the upper side of the strips, e.g. aluminum layer, without having a negative effect on other important properties of the screen. The light transmission may also be significantly increased for screens with transparent strips if the yarn covering the top layer is minimized.

In one embodiment of the greenhouse screen of the invention one side of the screen has a higher amount of weft threads than the opposite side of the screen, which means that more than 50% of the transverse weft threads of the yarn framework pass on said one side of the strips 11 of film material, preferably on the underside of the strips 11. More than 60%, more than 70%, more than 80% and even more than 90% of the transverse weft threads may pass on the underside of the strips 11, during the knitting process. It is also possible that all weft threads of the yarn framework are located on only one side of the strips of film material. This may be accomplished by omitting one or more of the weft threads, e.g. 13a, passing on the upper side of the strips.

For example at least 10% of the transverse weft threads that normally would pass on the upper side of the strips 11 may be omitted in the yarn framework. In further embodiments more than 20%, more than 40%, more than 60% and even more than 80% of the transverse weft threads that normally would pass on the upper side of the strips 11 during the knitting process may be omitted from the yarn framework. In a still further embodiment no weft threads pass on the upper side of the strips 11 during the knitting process. Thus in this embodiment all transverse weft threads are located on only one side of the strips.

Figure 3:
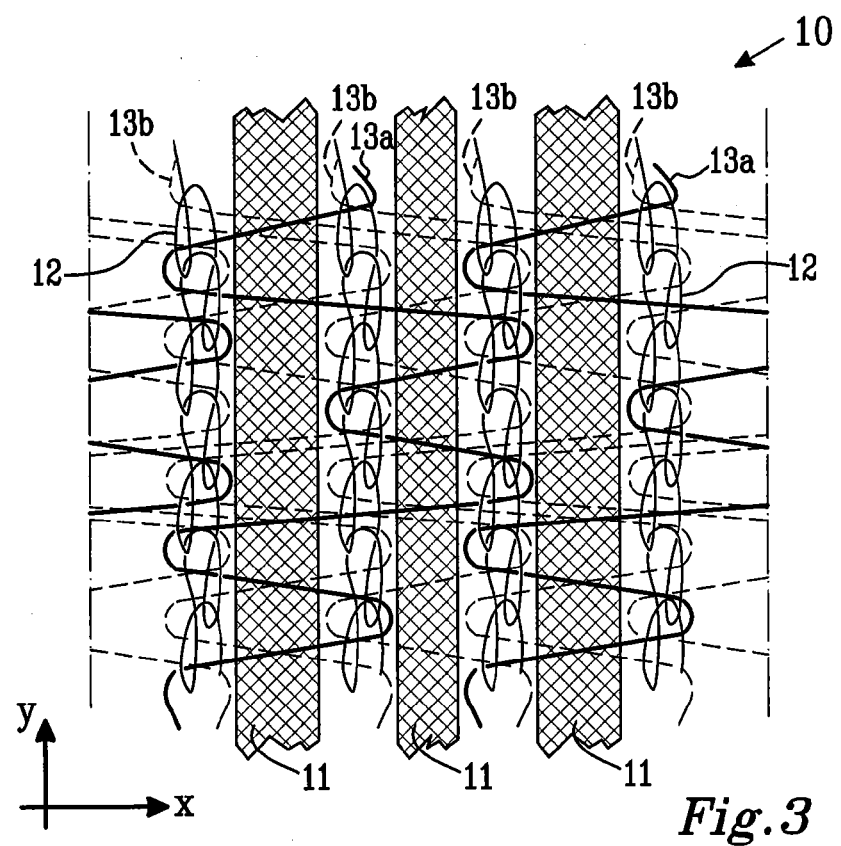
FIG. 3 shows a schematic enlarged view of a part of a warp-knitted screen according to a still further embodiment of the invention.
Figure 4:
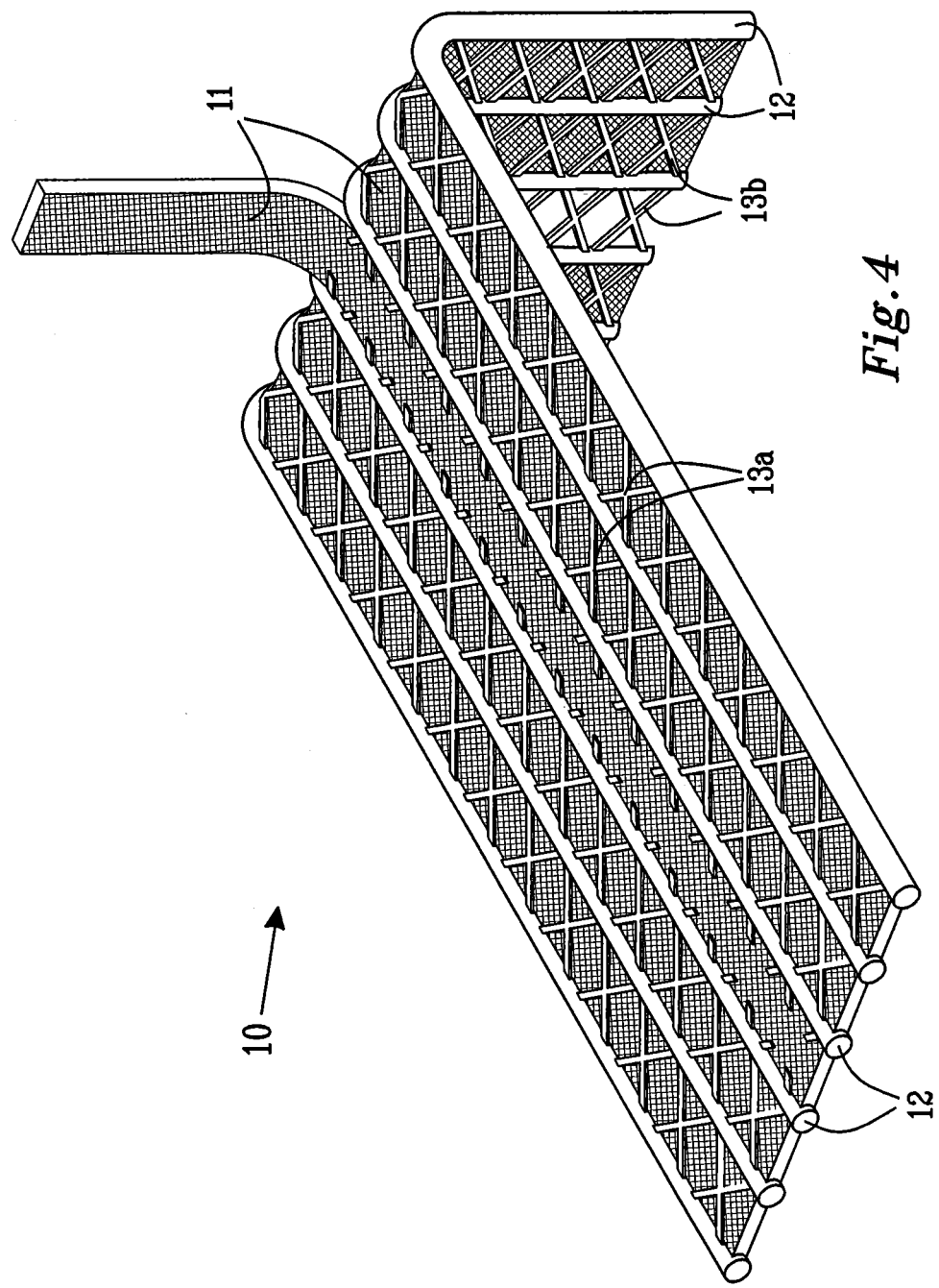
FIG. 4 illustrates schematically the method for testing peel strength of the bond between the strip and the yarn.

FIG. 3 shows an embodiment of the invention wherein about 70% of the transversally extending weft threads pass on only one side of the film strips.

In some cases it may be advantageous that there are transversely extending weft threads on both sides of the film strips, wherein at least 5%, preferably at least 10% of the weft threads should pass on the side of the film strips having the lowest amount of weft threads.

The strips of film material are fixed to the yarn framework by either one or a combination of two methods. The yarn framework may be bonded to the top polymer layer located at one or both surfaces of the strips 11 of film material, through the application of temperature and possibly also pressure, forming a thermal bond with a peel strength of at least 1 mN/mm, preferably with a peel strength of at least 10 mN/mm, more preferably with a peel strength of at least 30 mN/mm. The strips 11 of film material may also be adhered to the thermoplastic polymer yarn component comprised in the threads of the yarn framework, through the application of temperature and possibly also pressure, forming a thermal bond with a peel strength of at least 1 mN/mm, preferably with a peel strength of at least 10 mN/mm, more preferably with a peel strength of at least 30 mN/mm.

The water vapor transmission which is an important property of the screen is mainly controlled by the width of the strips and the type of yarn used. Normally, the strips should completely fill the voids in between the pillar stitches to maximize the energy saving properties of the screen. However, occasionally it is an advantage to have a screen that can transmit more water vapor to lower the humidity level in the greenhouse. This may be achieved by using a narrower strip that does not completely fill out the void between the pillar stitches (warp threads). However, in greenhouse screens wherein the strips of film material are interconnected solely by conventional stitching this may cause problems with strips being pulled out of the structure of the screen by wind etc. when the strip is no longer in contact with the yarn that will hold the strip in place by friction forces.

In the present invention, this problem is solved by fixing the strip to the yarn by thermal bonding instead of relying on friction, avoiding the above mentioned negative consequences. This makes it possible to create a screen wherein the strips of film material have different widths, thereby forming gaps in the continuous surface to suit the specific vapor transmitting requirements. Gaps are formed because the edges of the strips of film material with a smaller width are not in contact with the adjacent strips. The distance between the longitudinal warp threads, i.e. the pillar stitches, at either side of the strips are usually the same. Strips with smaller width are held firmly in place by thermal bonding to the weft threads.

Included in the invention are embodiments wherein at least 10%, 20%, 30%, 40%, 50%, 60%, 70%, 80%, 90% or even 100% of the strips have a smaller width than the distance between the warp threads. Said strips may have a width that is at least 10%, preferably at least 20% smaller than the width between the warp threads.

A greenhouse screen comprising strips of different widths is illustrated in FIG. 3.

The greenhouse screen of the invention may be manufactured as follows: strips of film material are interconnected to each other by a yarn framework through hosiery, knitting, warp-knitting or weaving known in the art. During the knitting/weaving process one or more of the transverse weft threads that normally pass on the upper side of the strips 11, during the knitting process may be omitted from the yarn framework, having the result that more than 50% or more than 60% or more than 70% or more than 80% or more than 90% or even 100% of the transverse weft threads of the yarn framework pass only on one side of the strips 11 of film material, preferably on the underside of the strips 11.

Thereafter the strips of film material are fixed to the yarn framework by exposing the screen to a temperature exceeding the softening point temperature of thermoplastic polymer top layer of the strips of film material and/or of the thermoplastic polymer yarn component comprised in the threads. Through the application of such a temperature the polymer layer or composition softens and connects the yarn framework to the strips of film material. Pressure may also be applied to strengthen the thermal bond between the strips and the yarn framework.

The other layer, the base layer, of the film and/or the other component of the threads are substantially unaffected by this thermal bonding, so that the structural integrity of the strips and/or the yarn framework is maintained.

The yarn framework should maintain at least a substantial part of its water-transporting capacity by capillary action also in those areas that are thermally bonded to the strips. This means that the yarn should not be completely melted by the thermal bonding, to keep the capillaries in the yarn open for water transport.

The capillary action, or also called the liquid wicking rate, may be tested according to ISO9073-6:2000. The greenhouse screen according to the invention should have a capillary rise of at least 10 mm after 10 seconds in both longitudinal (warp) direction and transverse (weft) direction. In one embodiment the greenhouse screen has a capillary rise of at least 20 mm after 10 seconds in both longitudinal (warp) direction and transverse (weft) direction.

This invention gives a significant improvement compared to the state of the art screens, since significantly less yarn can be used in the screen due to the fact that the strips and the yarns are thermally bonded together and hence less yarn is needed to fix the strip in its position. This makes it possible to make a screen with higher energy savings, because less yarn is covering the low emitting side of the strips in the screen, decreasing the emissivity of the screen. Similarly, less yarn is covering the transparent strips increasing the light transmission. Moreover, less yarn will further reduce the bundle size of the screen. In addition, the thermal bonding between the strip and the yarn further makes the screen stronger and it can withstand rougher handling before it gets deformed.

Method for Testing Peel Strength

The peel strength between the strips and the yarn is tested according to ISO11339:2010. In this test the peel strength between the plastic strip and the yarn can be tested only on one side at a time. Accordingly, all peel strength values in this text and in the claims refer to the peel strength between one side of one strip and the yarn. The minimum values given for the peel strength should apply for any side of the strip with respect to the yarn. Of course the total peel strength can be higher if the peel strengths on the two sides of the strip are summed.

The samples are prepared by cutting a sample according to the standard. The test is performed with respect to the peel strength between one strip and the yarn framework on one side of the strip. Any yarn crossing the strip on the opposite side of the strip to the tested side has to be cut loose to prevent erroneous values in the test. If the amount of yarn in the yarn framework on the opposite sides of the strip is different the test should be performed on both sides of the strip.

The crosshead separation rate is 100 mm/min.

Bonding has occurred if the average peel force to remove the strip from the yarn framework on any side of the strip is at least 1 mN/mm, i.e. the peel force should be at least 1 mN/mm. Preferably the peel force should be at least 10 mN/mm, and more preferably at least 30 mN/mm.

Method for Testing Capillary Action (Liquid Wicking Rate)

The capillary action of the screen is tested according to ISO9073-6:2000. The liquid was tap water coloured by Foron Blue RD-GLF supplied by Sandoz AG, Basel, Switzerland. The height of the capillary rise of the liquid was recorded after 10 s, and after 30 s. The samples were tested both in warp (longitudinal) and weft (transverse) direction. The mean value of five measurements was taken.

Example 1

One example of a greenhouse screen according to the invention is a woven or knitted screen comprising plastic strips of Hostaphan RPSM from Mitsubishi Polyester Film Gmbh, Wiesbaden, Germany, which is commercially available. The film has a thickness of 25 μm. The film is a multi-layer polyester film comprising an outer layer with a thermoplastic polymer material, capable of forming a thermal bond to the yarn framework. The layer thicknesses are within the ranges described in this application.

Figure 1B:
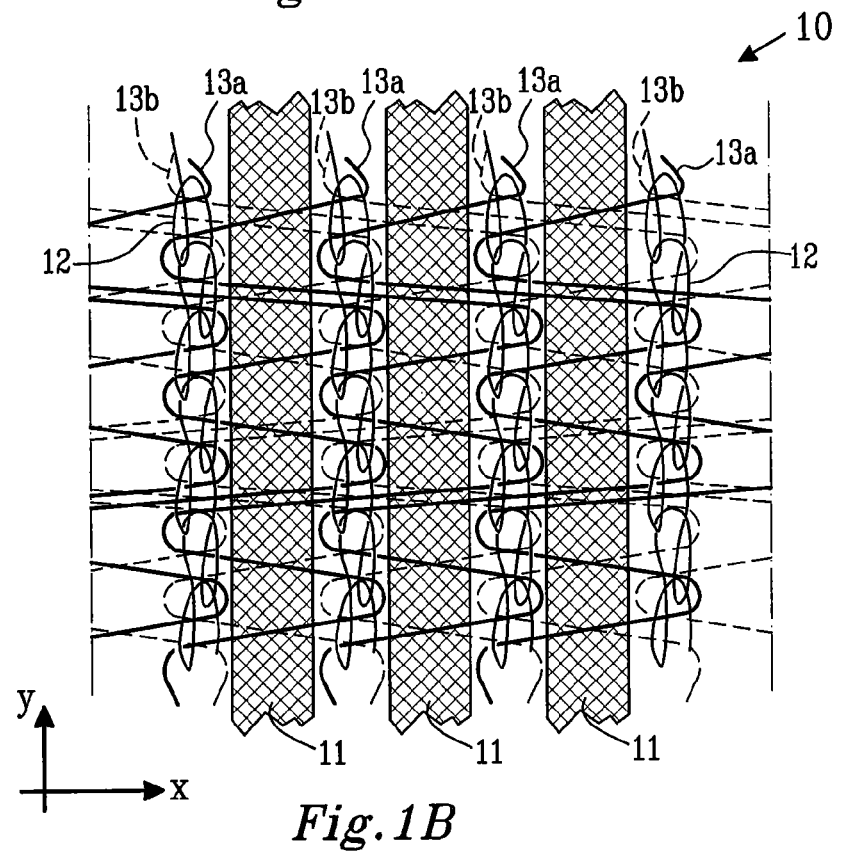
Figure 2:
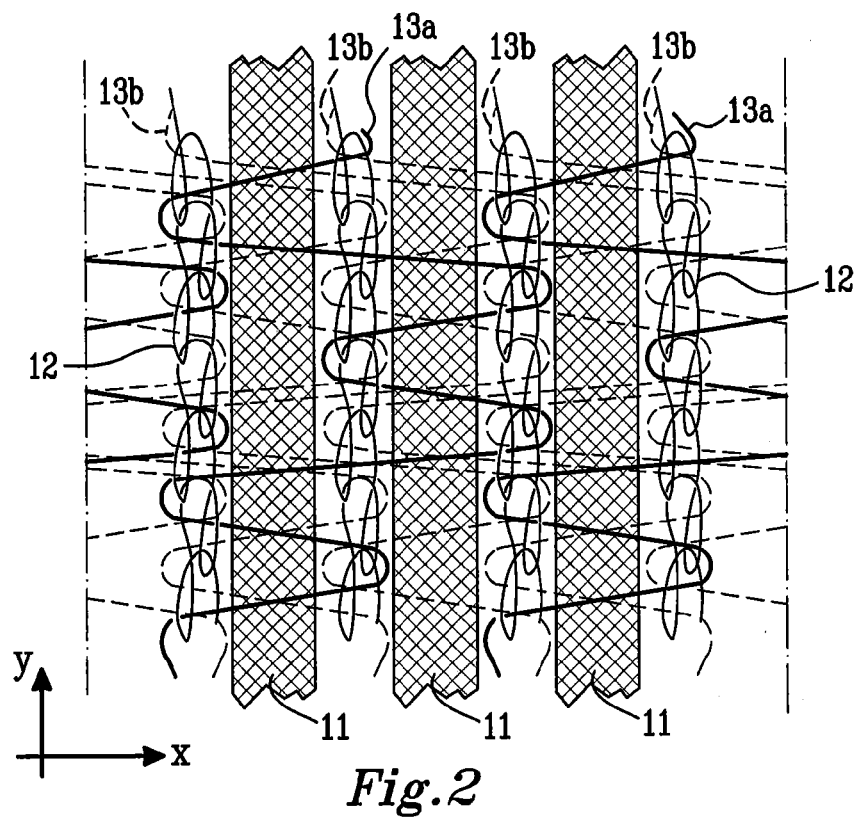
FIG. 2 shows a schematic enlarged view of a part of a warp-knitted screen according to a further embodiment of the invention.

A warp-knitted screen was produced with strips of this film connected by a flat polyester yarn framework comprising longitudinal warp threads and transverse weft threads as illustrated in FIG. 1. The weft treads cross the strip 6 times on each side per 10 mm of the length of the strip. The strips are arranged closely edge to edge. The screen was subsequently exposed to 120° C. and a pressure when the screen is rapped around a roller with diameter of 150 mm and pulled with a force of 20 kg.

An average peel force of 3.8 mN/mm width over a 100 mm distance is needed to break the bond between the yarn and the 4 mm wide strip (ISO11339:2010) on the side of the strip capable of forming a thermal bond. No bonding could be measured for the opposite side of the strip (<1 mN/mm).

The capillary rise of tap water was measured according to ISO9073-6:2000. In the warp direction the capillary rise after 10 s was 28 mm (standard deviation 2 mm) and after 30 s 37 mm (standard deviation 2 mm). In the weft direction the capillary rise after 10 s was 34 mm (standard deviation 2 mm) and after 30 s 41 mm (standard deviation 3 mm).

Example 2

One example of a greenhouse screen according to the invention is a woven or knitted screen comprising plastic strips of Hostaphan RPSM from Mitsubishi Polyester Film Gmbh, Wiesbaden, Germany, which is commercially available. The film has a thickness of 25 μm. The film is a multi-layer polyester film comprising an outer layer with a thermoplastic polymer material, capable of forming a thermal bond to the yarn framework. The layer thicknesses are within the ranges described in this application.

A warp-knitted screen was produced with strips of this film connected by a flat polyester yarn framework comprising longitudinal warp threads and transverse weft threads as illustrated in FIG. 1. The weft treads cross the strip 6 times on each side per 10 mm of the length of the strip. The 4 mm strips are arranged closely edge to edge. The screen was subsequently exposed to 185° C. and a pressure of 60 g/cm2.

An average peeling force of 32 mN/mm width over a 100 mm distance is needed to break the bond between the yarn and the 4 mm wide strip (ISO11339:2010) on the side of the strip capable of forming a thermal bond. No bonding could be measured for the opposite side of the strip (<1 mN/mm).

The capillary rise of tap water was measured according to ISO9073-6:2000. In the warp direction the capillary rise after 10 s was 24 mm (standard deviation 3 mm) and after 30 s 31 mm (standard deviation 3 mm). In the weft direction the capillary rise after 10 s was 32 mm (standard deviation 2 mm) and after 30 s 38 mm (standard deviation 2 mm).

Example 3

One example of a greenhouse screen according to the invention is a woven or knitted screen comprising plastic strips of Hostaphan RPSM from Mitsubishi Polyester Film Gmbh, Wiesbaden, Germany, which is commercially available. The film has a thickness of 25 μm. The film is a multi-layer polyester film comprising an outer layer with a thermoplastic polymer material, capable of forming a thermal bond to the yarn framework. The layer thicknesses are within the ranges described in this application.

A warp-knitted screen was produced with strips of this film connected by a yarn framework comprising longitudinal warp threads and transverse weft threads as illustrated in FIG. 1. The weft treads cross the strip 6 times on each side per 10 mm of the length of the strip. The warp threads consist of a flat polyester yarn. The weft yarn on the side of the strip with the thermoplastic polymer material capable of forming a thermal bond to the yarn framework consists of an air texturized yarn consisting of three flat polyester yarns, and a low melt yarn on one side of the strip. The weft yarn on the opposite side of the strip to the side with the thermoplastic polymer material capable of forming a thermal bond to the yarn framework consists of a flat polyester yarn. The 4 mm strips are arranged closely edge to edge. The screen was subsequently exposed to 185° C. and a pressure of 60 g/cm2.

An average peeling force of 41 mN/mm width over a 100 mm distance is needed to break the bond between the yarn and the 4 mm wide strip (ISO11339:2010) on the side of the strip capable of forming a thermal bond. No bonding could be measured for the opposite side of the strip (<1 mN/mm).

The capillary rise of tap water was measured according to ISO9073-6:2000. In the warp direction the capillary rise after 10 s was 25 mm (standard deviation 2 mm) and after 30 s 29 mm (standard deviation 4 mm). In the weft direction the capillary rise after 10 s was 37 mm (standard deviation 2 mm) and after 30 s 50 mm (standard deviation 2 mm).

Example 4

One example of a greenhouse screen according to the invention is a woven or knitted screen comprising plastic strips of standard packaging polyester film. The film has a thickness of 19 μm.

A warp-knitted screen was produced with strips of this film connected by a yarn framework comprising longitudinal warp threads and transverse weft threads as illustrated in FIG. 1. The weft treads cross the strip 6 times on each side per 10 mm of the length of the strip. The warp threads consist of a flat polyester yarn. The weft yarn on the side of the strip with the thermoplastic polymer material capable of forming a thermal bond to the yarn framework consists of an air texturized yarn consisting of three flat polyester yarns, and a low melt yarn on one side of the strip. The weft yarn on the opposite side of the strip to the side with the thermoplastic polymer material capable of forming a thermal bond to the yarn framework consists of a flat polyester yarn. The 4 mm strips are arranged closely edge to edge. The screen was subsequently exposed to 185° C. and a pressure of 60 g/cm2.

An average peeling force of 71 mN/mm width over a 100 mm distance is needed to break the bond between the yarn and the 4 mm wide strip (ISO11339:2010) on the side of the strip capable of forming a thermal bond. No bonding could be measured for the opposite side of the strip (<1 mN/mm).

The capillary rise of tap water was measured according to ISO9073-6:2000. In the warp direction the capillary rise after 10 s was 29 mm (standard deviation 3 mm) and after 30 s 34 mm (standard deviation 1 mm). In the weft direction the capillary rise after 10 s was 44 mm (standard deviation 1 mm) and after 30 s 54 mm (standard deviation 2 mm).

The invention claimed is:

1. A greenhouse screen comprising strips of film material, said strips extending in a longitudinal direction of the screen and are interconnected by a yarn framework of transverse threads and longitudinal threads to form a continuous product, said yarn framework having liquid-transporting capacity by capillary action, wherein:
the yarn framework is thermally bonded to at least one side of the strips of film material, so that at least a part of the material in the film strips and/or the yarn framework has been melted or softened and bonds to parts of the yarn framework and/or film strips at contact points, wherein also those parts of the yarn framework that are thermally bonded to the strips have liquid-transporting capacity by capillary action.

2. A greenhouse screen according to claim 1, wherein said greenhouse screen has a capillary rise of tap water as measured according to ISO9073-6:2000 of at least 10 mm after 10 seconds both in longitudinal and in transverse direction of the screen.

3. A greenhouse screen according to claim 1, wherein:
said film material is a multilayer film comprising at least two layers, wherein at least one top layer is a thermoplastic polymer top layer having a softening point of between 5-200° C. lower than another layer of the multilayer film.

4. A greenhouse screen according to claim 3, wherein the thermoplastic polymer top layer has a softening temperature of between 7-185° C. lower than the another layer of the multilayer film.

5. A greenhouse screen according to claim 3, wherein the thermoplastic polymer top layer is chosen from polymer materials of the group consisting of polyethylene and copolymers thereof, polypropylene and copolymers thereof, polyesters and co-polyesters, polyamides and co-polyamides, acrylics.

6. A greenhouse screen according to claim 1, wherein the strips comprise a reflective metal foil layer laminated to a multilayer film.

7. A greenhouse screen according to claim 1, wherein the strips of film material are bonded to the yarn framework with a peel strength according to ISO 11339:2010 of at least 1 mN/mm.

8. A greenhouse screen according to claim 1, wherein threads making up the yarn framework comprises at least two different components, wherein at least one component is a thermoplastic polymer yarn component having a softening temperature of between 5-200° C. lower than the other component, and in that the yarn framework is thermally bonded to at least one side of the strips of film material.

9. A greenhouse screen according to claim 8, wherein thermoplastic polymer yarn component has a softening temperature of between 7-185° C. lower than the other yarn component.

10. A greenhouse screen according to claim 8, wherein the thermoplastic polymer yarn component is chosen from polymer materials of the group consisting of polyethylenes or copolymers thereof, polypropylenes or copolymers thereof, polyamides, polyesters or copolymers thereof.

11. A greenhouse screen according to claim 8, wherein the thermoplastic polymer yarn component is incorporated into the yarn framework by intertwining one or more fibers together, wherein at least one of the fibers comprises said thermoplastic polymer yarn component.

12. A greenhouse screen according to claim 8, wherein the thermoplastic polymer yarn component forms a coat covering a fiber core material, said fiber core material has a higher melting temperature than the thermoplastic polymer yarn component.

13. A greenhouse screen according claim 8, wherein the thermoplastic polymer yarn component forms a coat covering at least part of the yarn framework.

14. A greenhouse screen according to claim 8, wherein both transverse threads and longitudinal threads comprise the thermoplastic polymer yarn component.

15. A greenhouse screen according to claim 8, wherein only the transverse threads comprise the thermoplastic polymer yarn component.

16. A greenhouse screen according to claim 8, wherein the thermoplastic polymer yarn component has a softening temperature of between 10-175° C. lower than the other yarn component.

17. A greenhouse screen according to claim 1, wherein the yarn framework is thermally bonded to both sides of the strips of film material.

18. A greenhouse screen according to claim 1, wherein the yarn framework is thermally bonded to only one side of the strips of film material.

19. A greenhouse screen according to claim 1, wherein one side of the screen has a higher amount of transverse threads than the opposite side of the screen, so that more than 50% of the transverse threads of the yarn framework, are located on said one side of the strips of film material.

20. A greenhouse screen according to claim 19, wherein more than 60% of the transverse threads of the yarn framework are located on said one side of the strips of film material.

21. A greenhouse screen according to claim 19 wherein at least 5% of the transverse threads of the yarn framework are located on said opposite side of the screen.

22. A greenhouse screen according to claim 19, wherein all transverse threads of the yarn framework are located on said one side of the strips of film material.

23. A greenhouse screen according to claim 19, wherein more than 70% of the transverse threads of the yarn framework are located on said one side of the strips of film material.

24. A greenhouse screen according to claim 19, wherein more than 80% of the transverse threads of the yarn framework are located on said one side of the strips of film material.

25. A greenhouse screen according to claim 19, wherein more than 90% of the transverse threads of the yarn framework are located on said one side of the strips of film material.

26. A greenhouse screen according to claim 19 wherein at least 10% of the transverse threads of the yarn framework are located on said opposite side of the screen.

27. A greenhouse screen according to claim 1, wherein said strips of film material are interconnected by the yarn framework through hosiery, knitting, warp-knitting or weaving.

28. A greenhouse screen according to claim 1, wherein one or more of the strips of film material has a width that is smaller than the distance between the longitudinal threads.

29. A greenhouse screen according to claim 28, wherein a gap is formed between said one or more strips and the adjacent strip(s), said gap permitting ventilation through said screen.

30. A greenhouse screen according to claim 1, wherein the strips of film material are bonded to the yarn framework with a peel strength according to ISO 11339:2010 of at least 10 mN/mm.

31. A greenhouse screen according to claim 1, wherein the strips of film material are bonded to the yarn framework with a peel strength according to ISO 11339:2010 of at least 30 mN/mm.

* * * * *